United States Patent [19]

Beutel et al.

[11] Patent Number: 4,949,819

[45] Date of Patent: Aug. 21, 1990

[54] TELESCOPING SHOCK DAMPER

[75] Inventors: Achim Beutel, Laudenbach; Michael Wetzel, Bürstadt, both of Fed. Rep. of Germany

[73] Assignee: Firma Carl Freudenberg, Weinheim/Bergstr., Fed. Rep. of Germany

[21] Appl. No.: 332,563

[22] Filed: Apr. 3, 1989

[30] Foreign Application Priority Data

Apr. 19, 1988 [DE] Fed. Rep. of Germany ....... 3813037

[51] Int. Cl.⁵ ............................................. F16F 9/36
[52] U.S. Cl. ............................... 188/322.17; 267/152; 267/227
[58] Field of Search .................. 188/322.17; 267/129; 277/227, 152, 153

[56] References Cited

U.S. PATENT DOCUMENTS

| | | | |
|---|---|---|---|
| 2,643,147 | 6/1953 | Funkhouser et al. | 267/129 X |
| 2,932,535 | 4/1960 | Peickii et al. | 277/227 X |
| 2,943,711 | 7/1960 | Rossman | 188/322.17 |
| 3,250,541 | 5/1966 | McKinven, Jr. | 277/152 X |
| 3,791,495 | 2/1974 | Keijzer et al. | 188/322.17 |
| 4,044,866 | 8/1977 | Ishida | 188/322.17 X |
| 4,166,523 | 9/1979 | Fujii et al. | 188/322.17 |
| 4,239,243 | 12/1980 | Bainard et al. | 277/153 |
| 4,258,927 | 3/1981 | Cather, Jr. | 277/152 |
| 4,709,932 | 12/1987 | Edlund et al. | 277/152 X |

FOREIGN PATENT DOCUMENTS 2759943 10/1977 Fed. Rep. of Germany.

Primary Examiner—George E. A. Halvosa
Attorney, Agent, or Firm—Felfe & Lynch

[57] ABSTRACT

In a telescoping shock damper, a seal which seals the plunger rod against the barrel comprises an inside lip ring of PTFE and an outside supporting ring of rubber. The lip ring and supporting ring are integrally joined together and are defined by faces running preferably radially which merge with one another.

1 Claim, 2 Drawing Sheets

TELESCOPING SHOCK DAMPER

BACKGROUND OF THE INVENTION

The invention relates to a telescoping shock damper, and more particularly, to a seal for a telescoping shock damper.

A telescoping shock damper of the general kind is disclosed in German Federal Pat. No. 2759943. The gasket that is used therein includes two sealing rings spaced apart axially from one another, which are made and installed independently of one another.

It is the purpose of the invention to provide a telescoping shock damper which, while having equal usefull life, is sealed around the plunger rod by a sealing ring which is easier to manufacture and install.

SUMMARY OF THE INVENTION

This purpose is accomplished in accordance with the invention by a seal having the distinctive features of claim 1.

In the telescoping shock damper in accordance with the invention, the seal consists of an inner lip ring of PTFE and an outer supporting ring of rubber, the lip ring and supporting ring being joined integrally and defined on both sides by faces which merge with one another. The manufacture and installation of the seal are thereby substantially simplified.

The lip ring can be provided with at least one sealing edge defined by converging conical surfaces. This markedly improves the wiping action, and it has been found to be advantageous for the conical surface in front of the sealing edge on the sealed chamber side to enclose a greater cone angle than the axially opposite conical surface. If two sealing edges are disposed in tandem axially, the result is not only better sealing action but longer useful life. The sealing edges can be substantially of the same profile.

To assure an especially stable, integral union between them, the supporting ring can overlap the lip ring, at the surfaces in contact between them, with at least one inwardly projecting bead on the side facing away from the sealed chamber. This bead can likewise be defined by two intersecting conical surfaces, which facilitates its manufacture.

In an embodiment of this kind, it has proven advantageous for the conical surface facing the sealed chamber to have a larger cone angle than the conical surface facing away from it. At the same time a certain approximation of the corresponding shape of the conical surfaces of the lip ring can be achieved, and thus a lip ring of great stability of shape can be produced while making the most economical use of the relatively expensive PTFE.

A substantially cylindrical surface may be in front of the bead on the sealed-chamber side. This cylindrical surface should have an axial length that is at least as great as the distance between the sealing edge and the corresponding face of the seal, as measured in the same direction. The peak pressures produced in the sealed chambers in critical operating situations will not be able in such a case to produce harmful deformation of the lip ring.

The lip ring and the supporting ring are best adhesively joined. Thus, in the finished state, they form a single unit which can be stocked and mounted with special ease.

For especially easy manufacture it has proven advantageous to form and vulcanize the supporting ring, consisting of rubber, directly onto the outer circumference of the lip ring. Thus any dimensional differences in the area of contact between the rings will be forestalled.

The faces of the finished seal can be parallel, which simplifies their manufacture and the configuration of the space needed for installation of the seal. They are best disposed substantially perpendicular to the axis of the seal.

In accordance with the invention, in a telescoping shock damper with a case and a plunger rod passing through the case at a point on its wall and sealed with respect to the case by a seal, the case enclosing a fluid and a statically biased gas pressure spring which acts on the fluid, the seal comprises an inner lip ring of PTFE and an outer supporting ring of rubber. The lip and supporting ring are integrally joined and defined axially on both sides by merging end faces.

For a better understanding of the invention, together with other and further objects thereof, reference is made to the following description, taken in connection with the accompanying drawings, and its scope will be pointed out in the appended claims.

Referring now to the drawings.

DESCRIPTION OF PREFERRED EMBODIMENT

Figure 1:
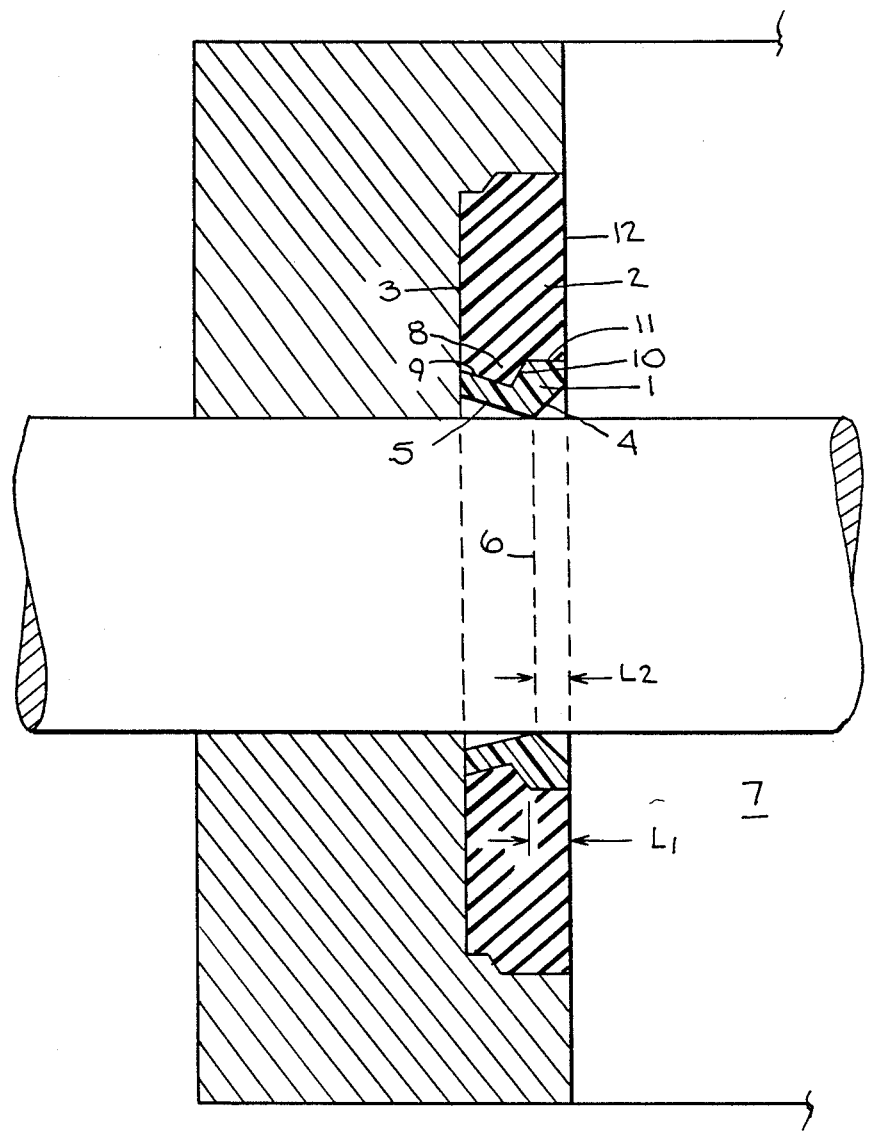
FIG. 1 is a sectional view of a seal in accordance with the invention.

Referring now more particularly to FIG. 1 of the drawings, the seal shown is intended for use in the space between the barrel and the plunger rod of a telescoping shock damper. The latter contains a certain volume of fluid which is biased by a cushion of gas such that a minimum internal pressure of 25 bar is produced in the vibration-free, static state. This pressure can be increased by the introduction of vibrations caused by operation of the vehicle and can easily achieve levels between 50 and 100 bar.

The seal consists of an internal lip ring 1 of PTFE and the supporting ring 2 of rubber attached to the outside thereof. The lip ring and supporting ring are integrally joined together by adhesion and defined axially on both sides by the merging faces 3 and 12 running perpendicular to the axis of the seal.

The lip ring 1 is defined on the inside by the two conical surfaces 4 and 5 which converge at the sealing edge 6. The conical surface 4 facing the sealed chamber 7 has a cone angle that preferably is about twice as great as that of the cone surface 5. Thus, not only a good seal of the chamber achieved, but also a good return of leakage to the chamber during the reciprocating movement of the plunger rod.

The supporting ring serves for static sealing and is defined internally in an area corresponding to the axial width of the cone surface 4 by the cylindrical surface 11. The relationship between the cone surface 4 and the surface of the plunger rod will thus undergo no undesirable change even when very high pressures occur.

On the side facing away from the sealed chamber, the cylindrical surface 11 of the supporting ring 2 is adjoined by the bead 8 which extends radially inwardly and engages a matingly shaped recess of the inner ring 1. The inner ring 1 is thus given an axial support which prevents shifting relative to the outer ring 2 under the effect of the pressure prevailing in the sealed chamber 7.

Additional security is provided in this respect by an adhesive bond between the inner ring 1 and the supporting ring 2. This preferably produced by forming and vulcanizing the supporting ring 2 of rubber directly on the outer circumference of the inner ring 1.

The bead 8 is defined on the inside by two intersecting conical surfaces. These surfaces have cone angles on both sides which preferably are substantially the same as that of the cone surfaces 5 and 4, respectively, of the inner ring. In spite of a comparatively minimal cross section, the inner ring 1 is thereby given great stability of shape. The good sealing action which can be achieved by the use of the new construction will therefore be maintained for a long period of time.

Figure 2:
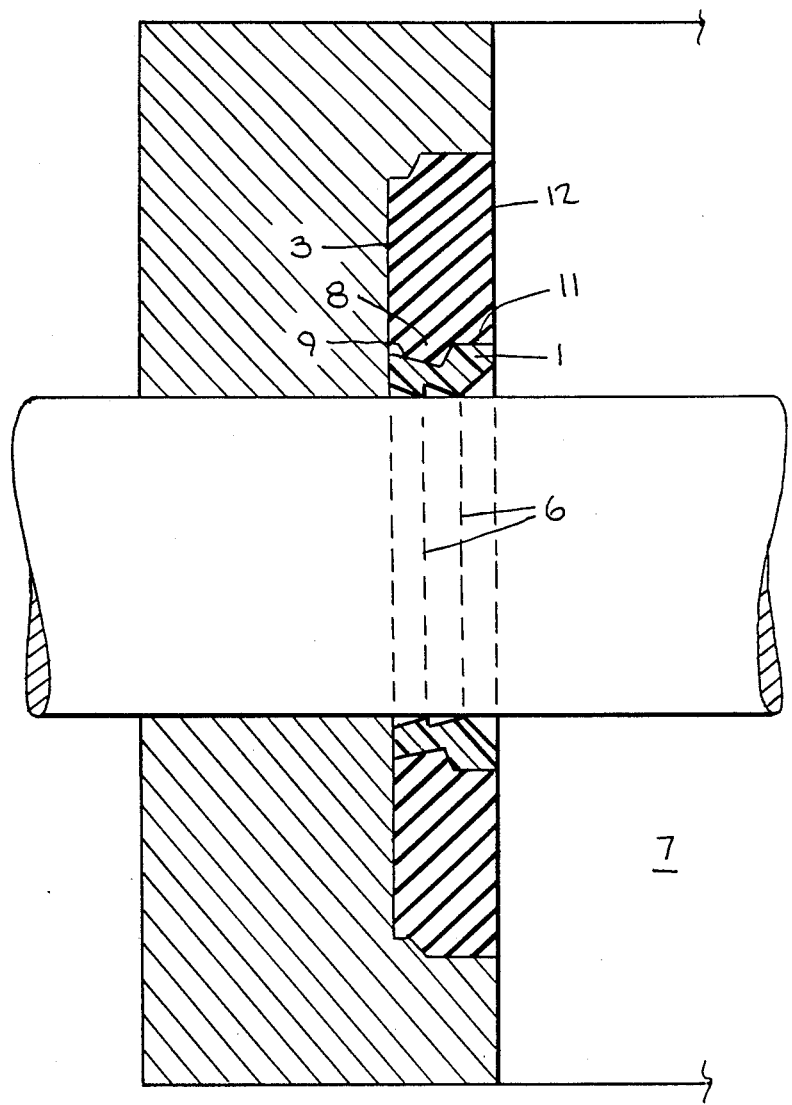
FIG. 2 is a sectional view of another embodiment of a seal in accordance with the invention.

The embodiment shown in FIG. 2 differs from the one described above only in that the lip ring 1 is provided with two sealing edges 6 disposed axially in tandem. They are formed each in the same manner by intersecting cone surfaces. This substantially improves the useful life of the seal.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a telescoping shock damper with a case and a plunger rod passing through the case at a point on its wall and sealed with respect to the case by a seal, the seal comprising:

an inner lip ring of PTFE and an outer supporting ring of rubber, the lip ring and supporting ring being integrally joined and defined axially on both sides by merging end faces, in which the lip ring has at least one sealing edge defined by two converging cone surfaces, in which a cone surface situated ahead of the sealing edge in the direction of a sealed chamber encloses a larger cone angle than an opposite cone surface, in which the supporting ring overlaps the lip ring with at least one inwardly projecting bead in the area of contact between them on a side facing away from a sealed chamber, in which the bead is defined by two intersecting cone surfaces, in which the cone surface facing the sealed chamber has a larger cone angle than the cone surface facing away therefrom, the seal including a substantially cylindrical surface extending ahead of the bead in the direction of the sealed chamber, to one of said faces, said cylindrically extended surface having an axial length (L 1) which is at least as great as a distance (L 2), measured in the same direction, between the sealing edge and said one face, in which seal the lip ring and the supporting ring are joined adhesively, in which seal the faces are substantially parallel to one another, and in which seal the faces are substantially perpendicular to an axis of the seal.

* * * * *